(12) United States Patent
Hung et al.

(10) Patent No.: US 10,131,006 B2
(45) Date of Patent: Nov. 20, 2018

(54) PNEUMATIC DEVICE FOR A PNEUMATIC SAW

(71) Applicant: Basso Industry Corp., Taichung (TW)

(72) Inventors: Liang-Chi Hung, Taichung (TW); Li-Hsin Chang, Taichung (TW)

(73) Assignee: Basso Industry Corp., Taichung (TW)

( * ) Notice: Subject to any disclaimer, the term of this patent is extended or adjusted under 35 U.S.C. 154(b) by 231 days.

(21) Appl. No.: 15/189,418

(22) Filed: Jun. 22, 2016

(65) Prior Publication Data

US 2016/0375512 A1    Dec. 29, 2016

(30) Foreign Application Priority Data

Jun. 24, 2015 (TW) ............... 104210126 U

(51) Int. Cl.
*F15B 15/14* (2006.01)
*B23D 51/18* (2006.01)
*B23D 49/10* (2006.01)

(52) U.S. Cl.
CPC ............. *B23D 51/18* (2013.01); *B23D 49/10* (2013.01); *F15B 15/1414* (2013.01); *F15B 15/1428* (2013.01); *F15B 15/1447* (2013.01)

(58) Field of Classification Search
CPC .................. B23D 51/18; B23D 49/10
See application file for complete search history.

(56) References Cited

U.S. PATENT DOCUMENTS

| 2,808,083 A * | 10/1957 | Miller ............... B23D 49/162 |
| | | 30/295 |
| 6,006,435 A | 12/1999 | Chien |
| 8,292,003 B2 * | 10/2012 | Baumann ............. B23D 51/18 |
| | | 173/114 |

* cited by examiner

Primary Examiner — Thomas E Lazo
(74) Attorney, Agent, or Firm — LeClairRyan

(57) ABSTRACT

A pneumatic device includes a cylinder, a buffer member and a piston unit. The cylinder includes a cylinder wall defining an air chamber. The buffer member has a tubular wall that defines a communicating hole. The tubular wall has a length greater than the wall thickness thereof. The piston unit includes a sealing member, and a rod member movably extending through the communicating hole. The rod member has a driven section received within the air chamber and mounted with the sealing member. The piston unit is movable between a restoring position where the driven section is spaced apart from the buffer member, and an impact position where at least one of the driven section and the sealing member is in contact with the buffer member.

9 Claims, 6 Drawing Sheets

PNEUMATIC DEVICE FOR A PNEUMATIC SAW

CROSS-REFERENCE TO RELATED APPLICATION

This application claims priority of Taiwanese Patent Application No. 104210126, filed on Jun. 24, 2015.

FIELD

The disclosure relates to a pneumatic device, and more particularly to a pneumatic device for a pneumatic saw.

BACKGROUND

Referring to FIG. 1, a conventional pneumatic saw disclosed in U.S. Pat. No. 6,006,435 includes a cylinder 11, a piston 12, a metal member 13 and a buffer member 14. The piston 12 is movable relative to the cylinder 11, and has a rod portion 121, and a piston portion 122 that is received in the cylinder 11 and that is in air-tight contact with the cylinder 11. The metal member 13 and the buffer member 14 are disposed in the cylinder 11. The buffer member 14 is located at one side of the metal member 13 opposite to the piston portion 122 of the piston 12.

When the piston 12 is actuated by compressed air to move the piston portion 122 toward the buffer member 14, the buffer member 14 serves to absorb the shock generated by the piston portion 122, and the metal member 13 serves to prevent the buffer member 14 from excessive deformation so as to prolong the service life of the buffer member 14.

However, the metal member 13 needs to occupy a space in the cylinder 11 so as to limit a travel distance of the piston portion 122 of the piston 12, and to limit the size of the buffer member 14.

SUMMARY

Therefore, an object of the disclosure is to provide a pneumatic device that can alleviate the drawback of the prior art.

According to the disclosure, the pneumatic device is for driving movement of a saw blade, and includes a cylinder, a buffer member and a piston unit. The cylinder includes a cylinder wall that surrounds an axis and that defines an air chamber therein. The buffer member is positioned within the air chamber, and has a tubular wall that surrounds the axis to define a communicating hole therein. The tubular wall has a length along the axis that is greater than the wall thickness thereof. The piston unit includes a sealing member, and a rod member that is movably extends through the communicating hole of the buffer member and that is mounted with the saw blade. The rod member has a driven section that is received within the air chamber. The sealing member is mounted to the driven section of the rod member, is co-moveable with the driven section, and is in air-tight contact with an inner surrounding surface of the cylinder wall. The piston unit is able to be driven pneumatically to move between a restoring position where the driven section is spaced apart from the buffer member, and an impact position where at least one of the driven section and the sealing member is in contact with the buffer member.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
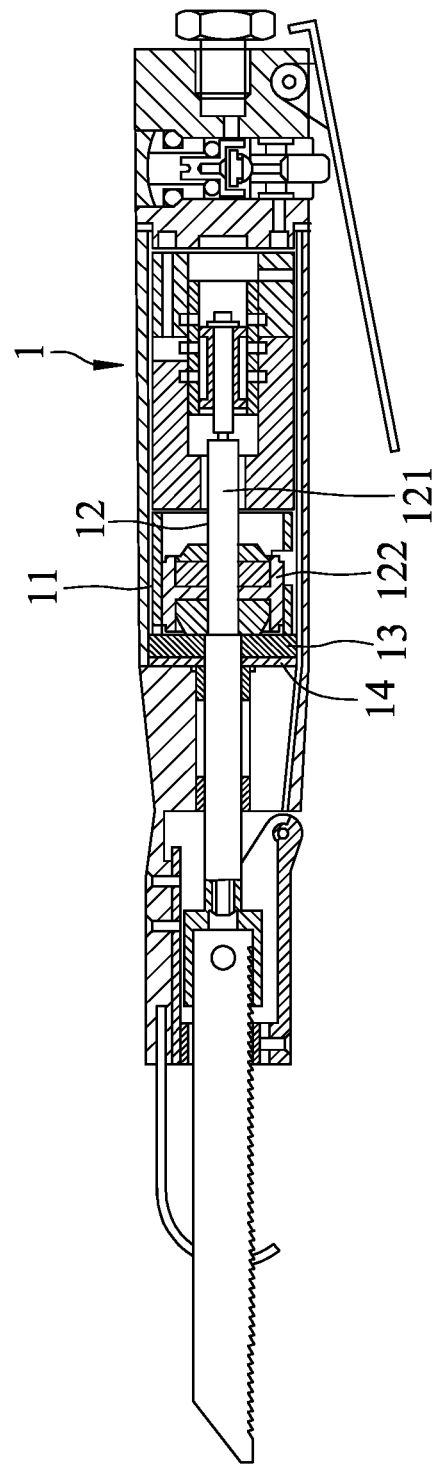
FIG. 1 is a sectional view illustrating a conventional pneumatic saw disclosed in U.S. Pat. No. 6,006,435.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
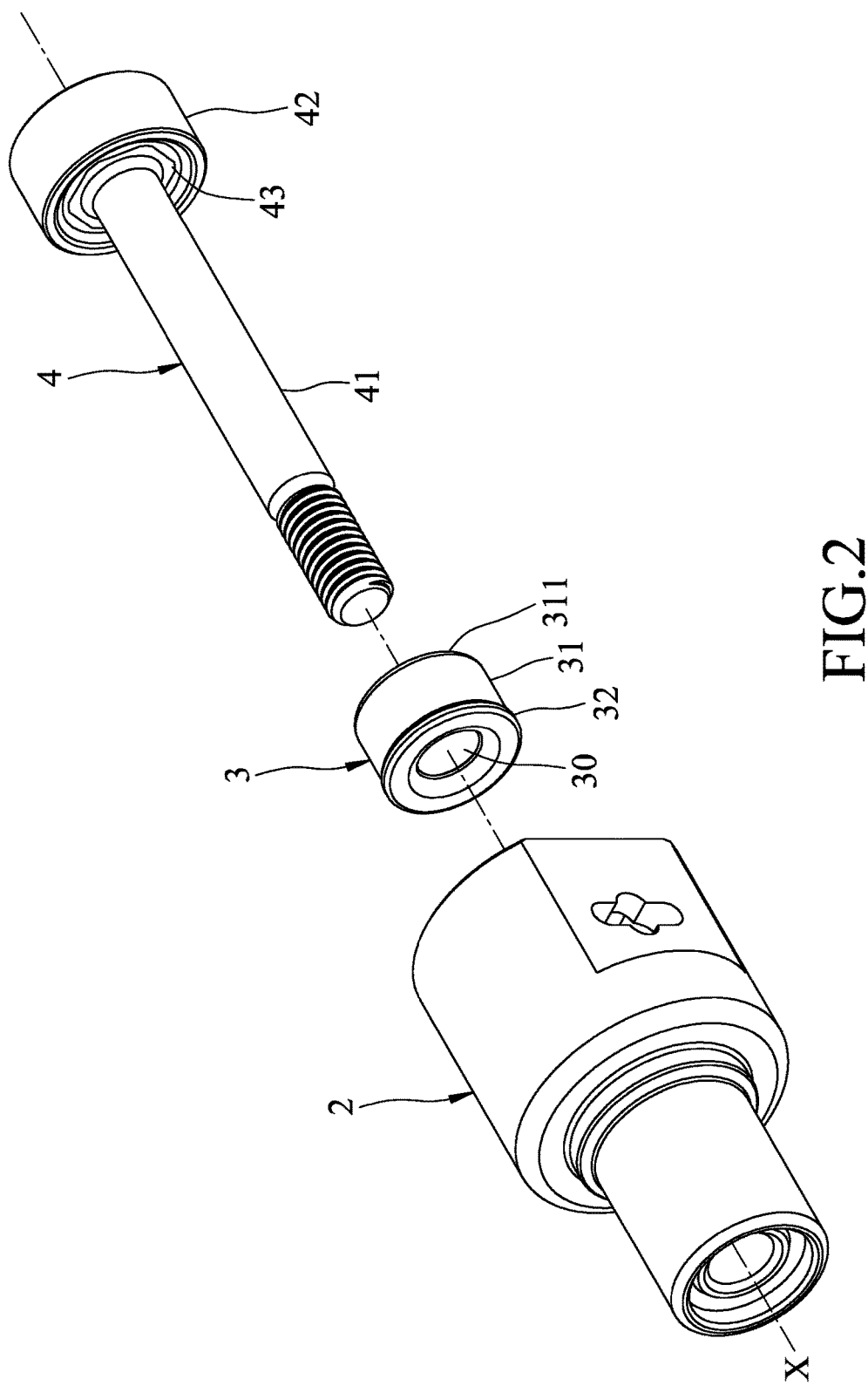
FIG. 2 is an exploded perspective view illustrating a first embodiment of the pneumatic device according to the disclosure.
Figure 3:
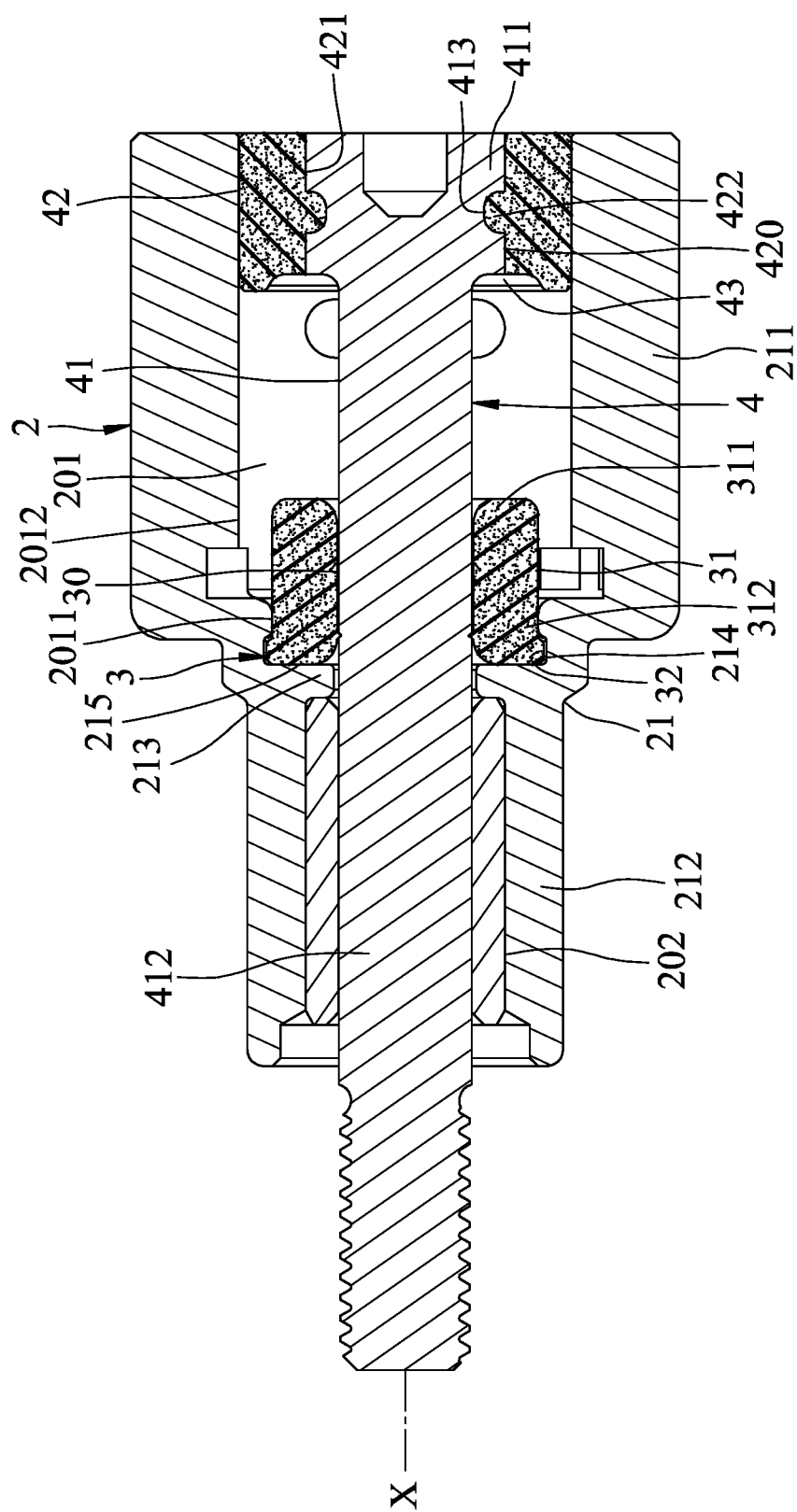
FIG. 3 is a schematic sectional view illustrating a piston unit of the first embodiment at a restoring position.

Referring to FIGS. 2 and 3, the first embodiment of the pneumatic device according to the disclosure is for driving movement of a saw blade (not shown) of a pneumatic saw, and includes a cylinder 2, a buffer member 3 and a piston unit 4.

The cylinder 2 includes a cylinder wall 21 that surrounds an axis (X) and that defines an air chamber 201 and a communicating passage 202 therein. The cylinder wall 21 has a large-diameter wall section 211 that defines the air chamber 201, a small-diameter wall section 212 that has an inner diameter smaller than that of the large-diameter wall section 211 and that defines the communicating passage 202, and a shoulder wall section 213 that is connected between the large-diameter wall section 211 and the small-diameter wall section 212, and that has an inner shoulder surface 215 facing toward the air chamber 201 and located between the air chamber 201 and the communicating passage 212. The air chamber 201 has a mounting portion 2011 that is proximate to the shoulder wall section 213, and a retaining portion 2012 that is located at one side of the mounting portion 2011 opposite to the shoulder wall section 213. The cylinder wall 21 further has a first buffer coupling structure 214 that is formed at an inner surrounding surface thereof. In this embodiment, the first buffer coupling structure 214 is configured as an annular groove.

Figure 5:
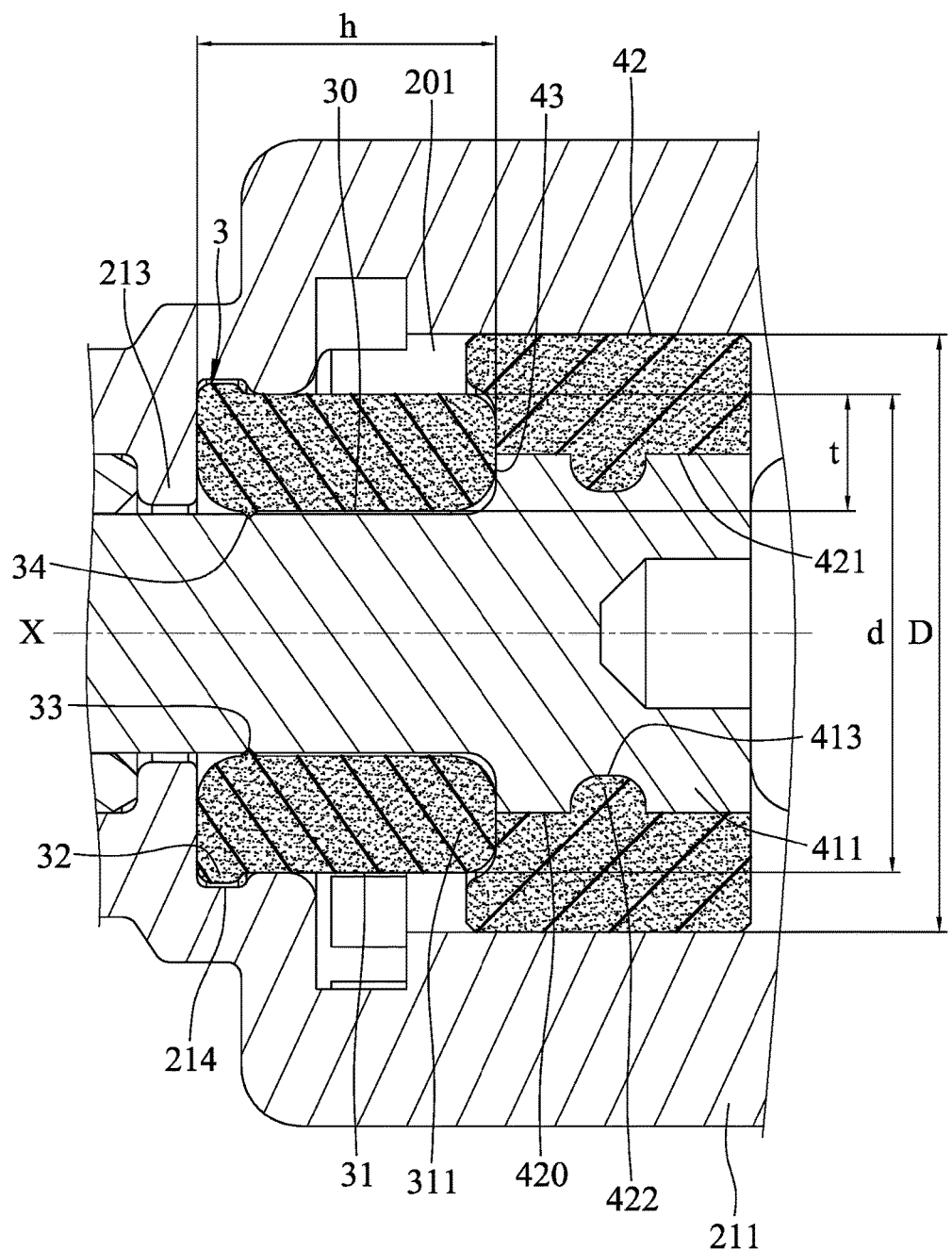
FIG. 5 is an enlarged view of a portion of FIG. 4 illustrating the piston unit at the impact position.

The buffer member 3 is disposed in the air chamber 201, and has a tubular wall 31, a second buffer coupling structure 32 and an annular rib 33 (see FIG. 5). The tubular wall 31 surrounds the axis (X) to define a communicating hole 30 therein, and has s amounting section 312 that is mounted to the mounting portion 2011 of the air chamber 201 and that abuts against the inner shoulder surface 215 of the shoulder wall section 213, and a tubular buffer section 311 that extends from the mounting section 312 into the retaining portion 2012 of the air chamber 201. The second buffer coupling structure 32 is formed at an outer surrounding surface of the mounting section 312 of the tubular wall 31 of the buffer member 3, and is engaged to the first buffer coupling structure 214 for positioning the buffer member 3 in the cylinder 2. In this embodiment, the second buffer coupling structure 32 is configured as an annular protrusion. The annular rib 33 is formed on an inner surrounding surface of the tubular wall 31.

Referring further to FIG. 5, the length (h) of the buffer member 3 along the axis (X) is greater than the wall thickness (t) of the buffer section 311 of the buffer member 3. The outer diameter (d) of the buffer section 311 of the buffer member 3 is smaller than an inner diameter (D) of a portion of the large-diameter wall section 211 that defines the retaining portion 2012 of the air chamber 201.

The piston unit 4 includes a rod member 41 and an annular sealing member 42.

The rod member 41 movably extends through the communicating hole 30 of the buffer member 3, and has a driven section 411 that is received within the air chamber 201 and that is aligned with the tubular buffer section 311 in the direction of the axis (X), a driving section 412 that extends through the communicating passage 202 and the communicating hole 30 of the buffer member 3, and that is in air-tight contact with the annular rib 33 of the buffer member 3, and a first sealing coupling structure 413 that is formed at an outer surrounding surface of the driven section 411. The driving section 412 is mounted with the saw blade for driving the movement of the saw blade.

The sealing member 42 is mounted to the driven section 411 of the rod member 41, and is co-moveable with the driven section 411. The sealing member 42 is in air-tight contact with the inner surrounding surface of the large-diameter wall section 211 of the cylinder wall 21, and has a second sealing coupling structure 422 that is formed at an inner surrounding surface 421 thereof, and that is engaged to the first sealing coupling structure 413 so that the sealing member 42 is fixedly mounted on the driven section 411 of the rod member 41. The inner surrounding surface 421 defines a through hole 420. One of the first sealing coupling structure 413 and the second sealing coupling structure 422 is configured as an annular groove, and the other one of the first sealing coupling structure 413 and the second sealing coupling structure 422 is configured as an annular protrusion.

The piston unit 4 further has an annular groove 43 that is formed in a side surface of the driven section 411 that faces toward the buffer member 3 and in a side surface of the sealing member 42 that faces toward the buffer member 3.

Figure 4:
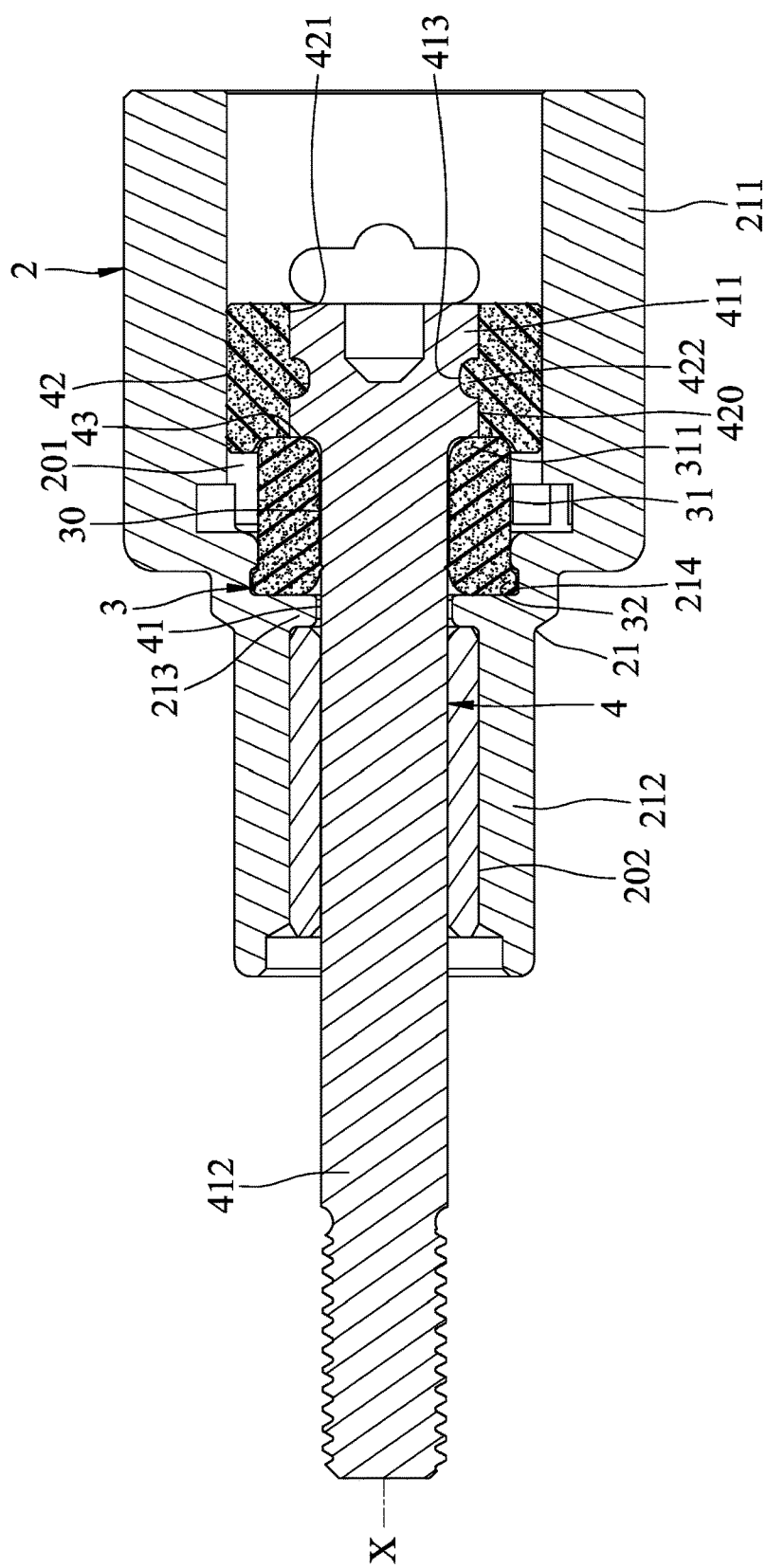
FIG. 4 is another schematic sectional view illustrating the piston unit at an impact position.

Referring to FIGS. 3 to 5, the piston unit 4 is driven pneumatically by compressed air to move between a restoring position (see FIG. 3) and an impact position (see FIGS. 4 and 5).

When the piston unit 4 is at the restoring position, the driven section 411 is spaced apart from the buffer member 3. When the piston unit 4 is driven to move from the restoring position to the impact position, the driven section 411 and the sealing member 42 are moved to impact the buffer member 3, and the buffer section 311 of the buffer member 3 is deformed to absorb the shock generated by the piston unit 4. At this time, the annular groove 43 of the piston unit 4 is configured to receive a distal end portion of the buffer section 311 of the buffer member 3, and a space between the large-diameter wall section 211 and the buffer section 311 of the buffer member 3 is configured to tolerate the deformation of the buffer section 311 of the buffer member 3. As a result, the compression ratio of the buffer section 311 is lowered during the deformation thereof, and the service life of the buffer member 3 is therefore prolonged.

Figure 6:
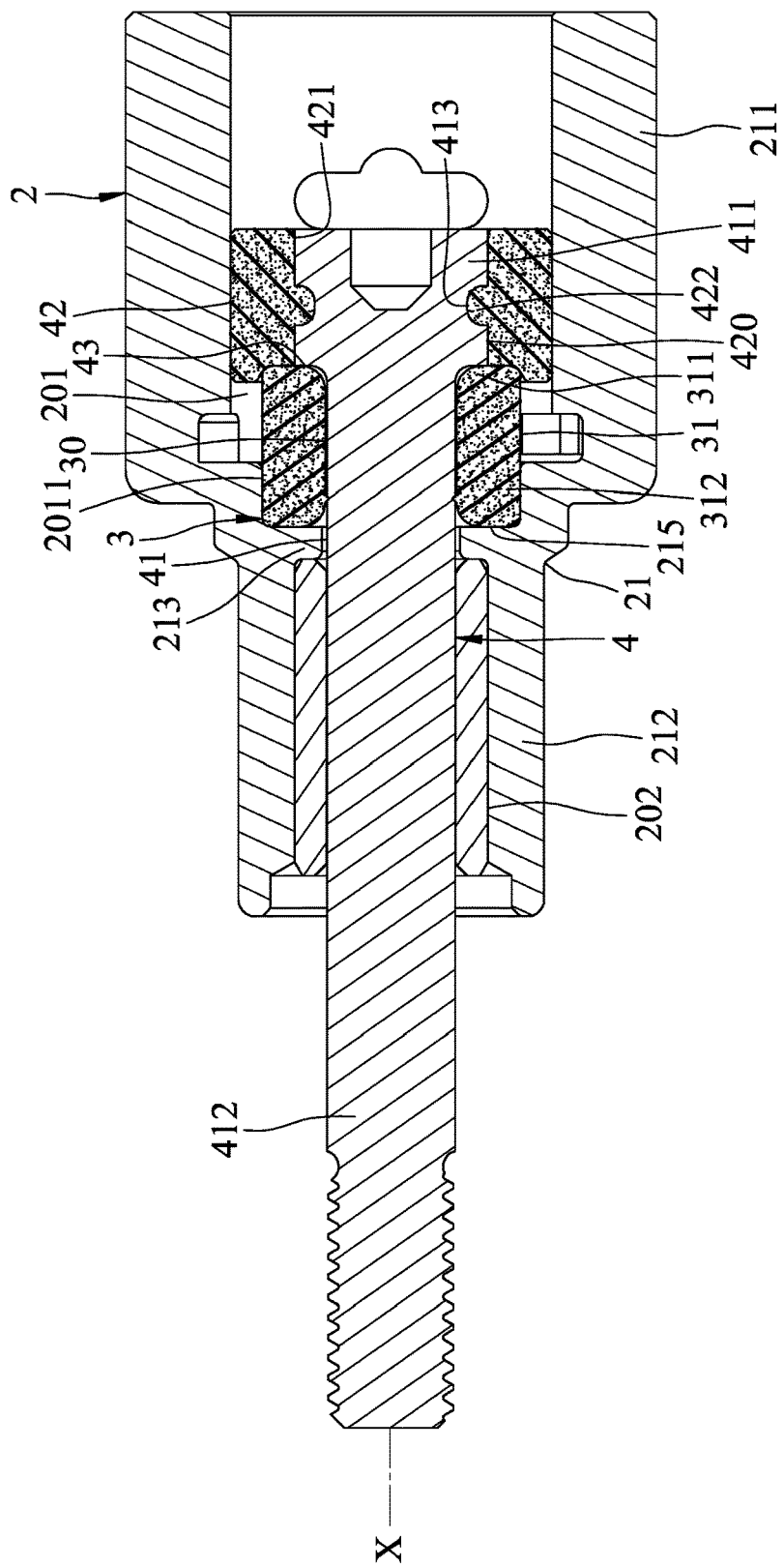
FIG. 6 is a schematic sectional view illustrating a piston unit of a second embodiment of the pneumatic device according to the disclosure at an impact position.

Referring to FIG. 6, the second embodiment of the pneumatic device according to the disclosure is similar to the first embodiment. The first buffer coupling structure 214 and the second buffer coupling structure 32 in the first embodiment (see FIG. 3) are omitted in the second embodiment. The mounting section 312 of the buffer member 3 is press-fitted into the mounting portion 2011 of the air chamber 201, and abuts against the inner shoulder surface 215 of the shoulder wall section 213.

As such, the effect of the first embodiment can also be achieved by the second embodiment.

In summary, the buffer member 3 in this disclosure has a relatively large length (h, see FIG. 5), so that the shock generated by the piston unit 4 during the movement of the piston unit 4 from the restoring position to the impact position can be absorbed more effectively. Moreover, since the annular groove 43 of the piston unit 4 receives the distal end portion of the buffer section 311 and the space between the large-diameter wall section 211 and the buffer section 311 tolerates the deformation of the buffer section 311 when the piston unit 4 is at the impact position, the compression ratio of the buffer section 311 can be lowered during the deformation thereof, and the service life of the buffer member 3 is therefore prolonged.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A pneumatic device adapted to drive movement of a saw blade, comprising:

a cylinder including a cylinder wall that surrounds an axis and that defines an air chamber therein;

a buffer member positioned within said air chamber, and having a tubular wall that surrounds the axis to define a communicating hole therein, said tubular wall having a length along the axis that is greater than the wall thickness thereof; and a piston unit including a sealing member, and a rod member that is movably extends through said communicating hole of said buffer member and that is adapted to be mounted with the saw blade, said rod member having a driven section that is received within said air chamber, said sealing member being mounted to said driven section of said rod member, being co-moveable with said driven section, and being in air-tight contact with an inner surrounding surface of said cylinder wall, said piston unit being able to be driven pneumatically to move between a restoring position where said driven section is spaced apart from said buffer member, and an impact position where at least one of said driven section and said sealing member is in contact with said buffer member;

wherein said cylinder wall further has a first buffer coupling structure that is formed at said inner surrounding surface thereof, said buffer member further having a second buffer coupling structure that is formed at an outer surrounding surface thereof, and that is engaged to said first buffer coupling structure for positioning said buffer member in said cylinder.

2. The pneumatic device as claimed in claim 1, wherein said rod member further has a first sealing coupling structure that is formed at an outer surrounding surface of said driven section, said sealing member having a second sealing coupling structure that is formed at an inner surrounding surface thereof, and that is engaged to said first sealing coupling structure so that said sealing member is fixedly mounted on said driven section of said rod member.

3. The pneumatic device as claimed in claim 2, wherein one of said first sealing coupling structure and said second sealing coupling structure is configured as an annular groove, and the other one of said first sealing coupling structure and said second sealing coupling structure is configured as an annular protrusion.

4. The pneumatic device as claimed in claim 1, wherein said first buffer coupling structure of said cylinder wall is configured as an annular groove, and said second buffer coupling structure of said buffer member is configured as an annular protrusion.

5. The pneumatic device as claimed in claim 1, wherein said rod member of said piston unit further has a driving section that extends through said communicating hole of said buffer member and that is adapted to connect with the saw blade.

6. The pneumatic device as claimed in claim 5, wherein said cylinder wall has a large-diameter wall section that defines said air chamber, a small-diameter wall section that has an inner diameter smaller than that of said large-diameter wall section and that defines a communicating passage through which said driving section of said piston unit extends, and a shoulder wall section that is connected between said large-diameter wall section and said small-diameter wall section, said buffer member abutting against said shoulder wall section.

7. The pneumatic device as claimed in claim 1, wherein said tubular wall of said buffer member has an outer diameter smaller than an inner diameter of a portion of said cylinder wall that defines said air chamber.

8. A pneumatic device adapted to drive movement of a saw blade, comprising:
a cylinder including a cylinder wall that surrounds an axis and that defines an air chamber therein;
a buffer member positioned within said air chamber, and having a tubular wall that surrounds the axis to define a communicating hole therein, said tubular wall having a length along the axis that is greater than the wall thickness thereof; and
a piston unit including a sealing member, and a rod member that is movably extends through said communicating hole of said buffer member and that is adapted to be mounted with the saw blade, said rod member having a driven section that is received within said air chamber, said sealing member being mounted to said driven section of said rod member, being co-moveable with said driven section, and being in air-tight contact with an inner surrounding surface of said cylinder wall, said piston unit being able to be driven pneumatically to move between a restoring position where said driven section is spaced apart from said buffer member, and an impact position where at least one of said driven section and said sealing member is in contact with said buffer member; and
wherein said buffer member further has an annular rib that is formed on an inner surrounding surface of said tubular wall and that is in air-tight contact with said rod member.

9. A pneumatic device adapted to drive movement of a saw blade, comprising:
a cylinder including a cylinder wall that surrounds an axis and that defines an air chamber therein;
a buffer member positioned within said air chamber, and having a tubular wall that surrounds the axis to define a communicating hole therein, said tubular wall having a length along the axis that is greater than the wall thickness thereof; and
a piston unit including a sealing member, and a rod member that is movably extends through said communicating hole of said buffer member and that is adapted to be mounted with the saw blade, said rod member having a driven section that is received within said air chamber, said sealing member being mounted to said driven section of said rod member, being co-moveable with said driven section, and being in air-tight contact with an inner surrounding surface of said cylinder wall, said piston unit being able to be driven pneumatically to move between a restoring position where said driven section is spaced apart from said buffer member, and an impact position where at least one of said driven section and said sealing member is in contact with said buffer member; and
wherein said tubular wall of said buffer member has a tubular buffer section that is aligned with said driven section of said rod member in the direction of the axis, said piston unit further having an annular groove that is formed in at least one of a side surface of said driven section that faces toward said buffer member and a side surface of said sealing member that faces toward said buffer member, said annular groove of said piston unit receiving a distal end portion of said buffer section of said buffer member when said piston unit is at the impact position.

* * * * *